Dec. 4, 1951  A. SIMMON  2,577,160
SAFETY LOCK FOR ROLL FILM CAMERA DOORS
Filed June 28, 1949  7 Sheets-Sheet 1

Alfred Simmon
INVENTOR.

BY Walter E. Willheim
ATTORNEY.

Dec. 4, 1951 A. SIMMON 2,577,160
SAFETY LOCK FOR ROLL FILM CAMERA DOORS
Filed June 28, 1949 7 Sheets-Sheet 4

Alfred Simmon
INVENTOR.
BY Walter E. Wollheim
ATTORNEY.

Dec. 4, 1951  A. SIMMON  2,577,160
SAFETY LOCK FOR ROLL FILM CAMERA DOORS
Filed June 28, 1949  7 Sheets-Sheet 7

Alfred Simmon
INVENTOR.

BY Walter E. Wallheim
ATTORNEY.

Patented Dec. 4, 1951

2,577,160

UNITED STATES PATENT OFFICE 2,577,160

SAFETY LOCK FOR ROLL FILM CAMERA DOORS

Alfred Simmon, Jackson Heights, N. Y., assignor to Simmon Brothers, Inc., Long Island City, N. Y., a corporation of New York Application June 28, 1949, Serial No. 101,811

3 Claims. (Cl. 95—31)

The object of this invention is an improved roll film camera. More specifically it concerns a safety lock for a roll film camera which makes it impossible to detach the camera back from the main housing, except in two positions of the roll film, the first being the position before the beginning of an operating cycle when the entire film is still completely wound on a loaded film spool, and the second position being the one assumed by the film after the end of an operating cycle, when the entire film has been completely transferred from the initially loaded spool to an initially empty storage spool. In other words, the operator cannot by mistake open the camera during an operating cycle when film extends from one spool to the other and when such inadvertent opening would spoil the film.

A preferred embodiment of this invention is illustrated in the attached drawings of which Fig. 1 is a vertical cross-sectional view through a roll film camera;

Fig. 2 is a rear view of the camera;

Figs. 3, 4 and 5 are rear views of the camera after certain parts, including a cover have been detached, so that the mechanism including a master element within the camera back becomes visible; in Fig. 3, the camera is shown as set for an exposure; in Fig. 4, the mechanism is shown during the film advancing process; Fig. 5 shows this mechanism in a position in which the safety lock permits the detachment of the camera back;

Like characters of reference denote similar parts throughout the drawings and the following specification which is divided into chapters, each referring to one of the principal elements of the camera.

Camera housing

Figure 1:
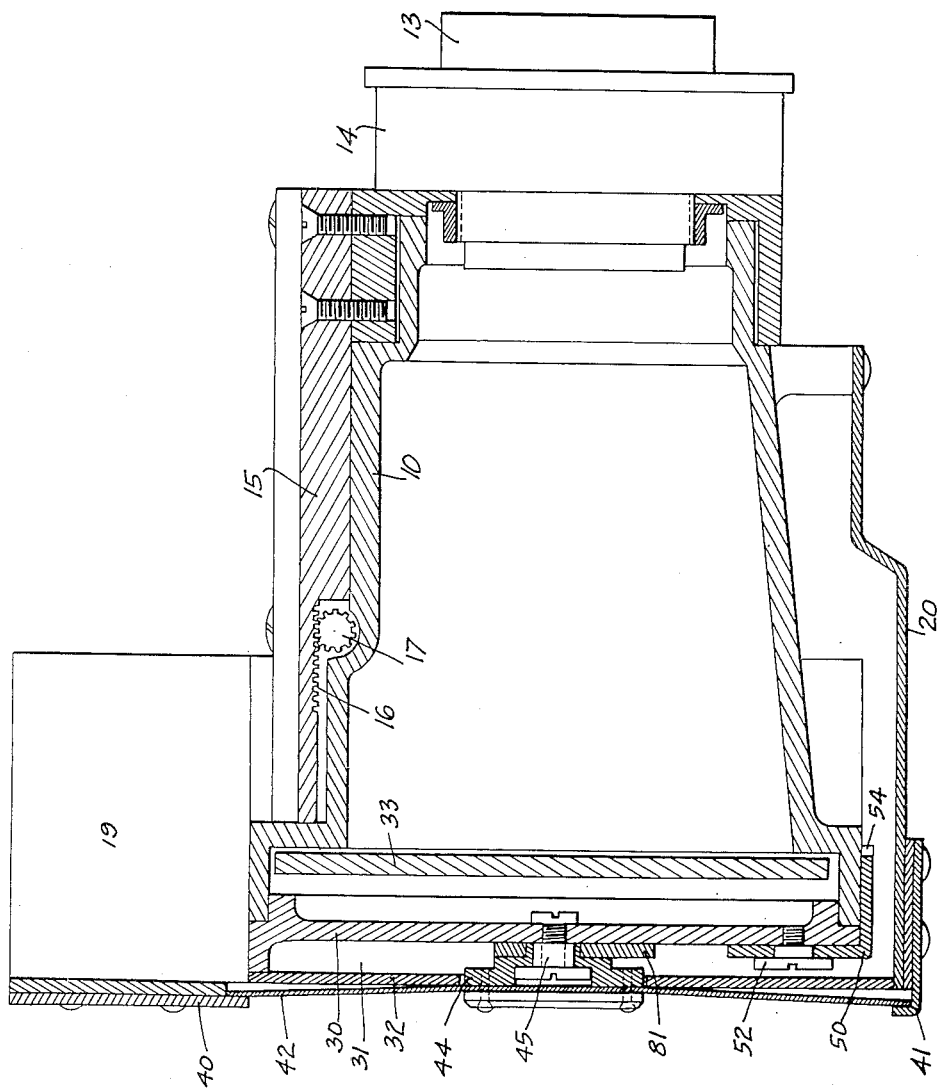
Figure 6:
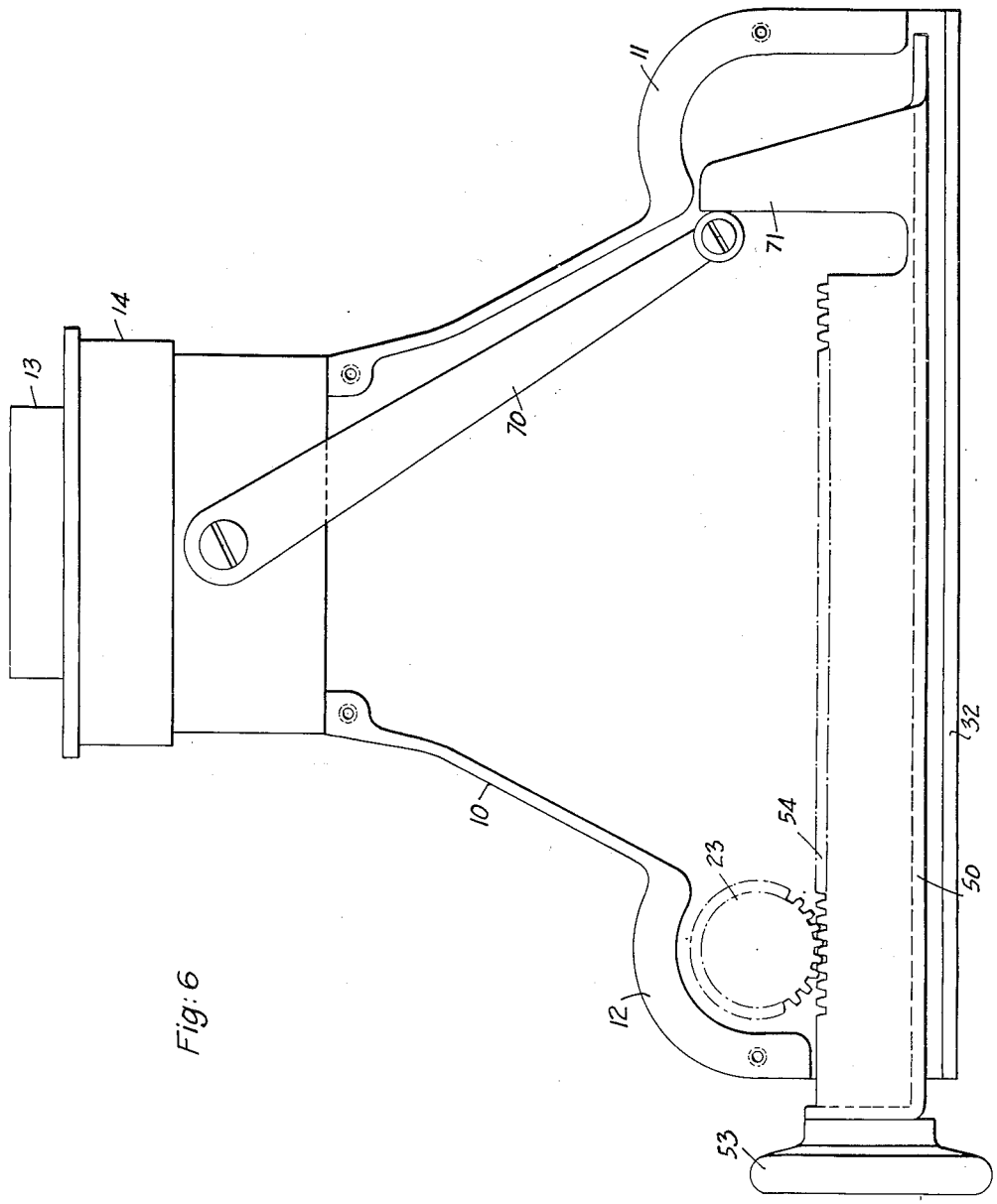
Fig. 6 is a bottom view of the camera after the removal of a cover.

A cross-sectional view of the camera housing which is preferably made from cast aluminum or the like is numbered 10 in Fig. 1, and its general outline can also be seen in Fig. 6. In the usual manner it comprises two compartments or pockets 11 and 12 which are adapted to accept film spools which are located on either side of the exposure aperture, which is conventional and is the aperture through which the film is exposed to light entering the camera from the lens. Before the beginning of an operating cycle a loaded film spool is inserted in pocket 11 and an empty spool is inserted in pocket 12. Between exposures film is transferred step by step from the first named spool to the last named one. A lens 13 and a shutter 14 are attached to the front of the camera. These two elements are only shown schematically, since their detailed design is of no importance to the purpose of this invention. Their distance from the exposure aperture is adjustable for focusing purposes, for example by means of a slide 15 which carries a rack 16 which in turn is engaged by a rotatable pinion 17. This pinion is operated by a knurled knob or small hand wheel which, however, is not shown in the drawings. A range and view finder 19 of any convenient construction is shown schematically as mounted on top of the camera housing. The bottom of the camera contains a cavity which is closed by a cover 20. This cavity may contain mechanism to set the shutter automatically when the film advancing mechanism is actuated.

Figure 7:
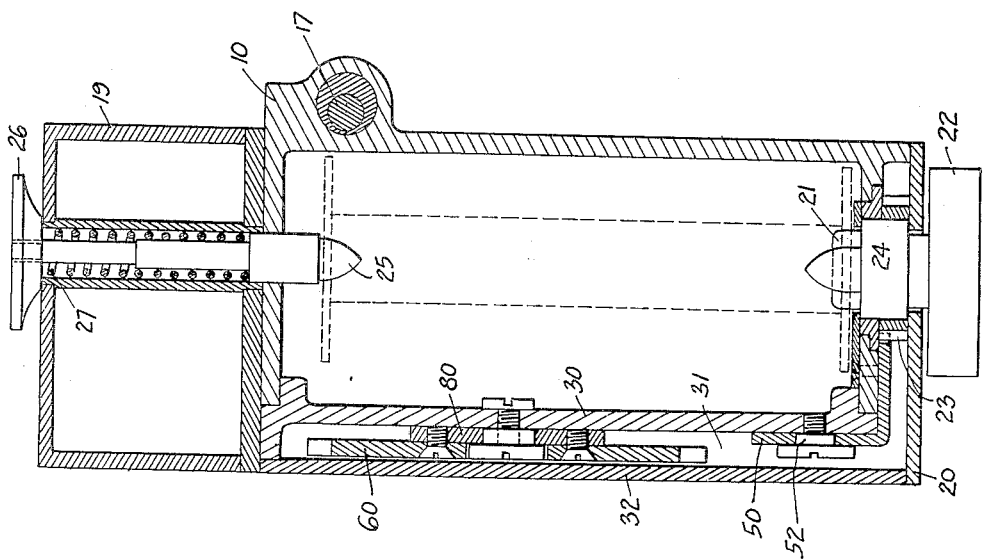
Fig. 7 is a cross-sectional view along the plane of line 7—7 in Fig. 3.

This is indicated schematically in Fig. 6 where a lever 70 is shown which is in operative contact with a projection 71 of gear rack 50 which forms part of the film advancing means to be described later. The connection between this lever and the shutter itself, has not been shown. A rotatable key 21, see Fig. 7, is mounted on the centerline of the aforementioned pocket 12, and may be rotated either by a knurled knob or hand wheel 22, or by a small gear 23 in a manner which will be described later. Hand wheel 22 or gear 23 are connected to rotatable key 21 by means of a unidirectional clutch 24 which is merely shown schematically and which may for example comprise a ratchet wheel or the like. The upper end of the film spool is supported in the usual manner by a shaft 25, which for loading purposes may be withdrawn by means of a knob 26 against the pressure of a spring 27 which normally holds the shaft in position.

Camera back

The camera is normally closed by the camera back which comprises a base 30 and a cover 32 between which a cavity 31 is formed containing a mechanism which will be described in detail later. Attached to the camera back is a pressure plate 33 which is pressed forward by spring pressure or the like and which locates the film in the exposure aperture of the camera in the usual manner. The mechanism referred to comprises means to lock the camera back to the camera housing, means to advance the film between exposures, cooperating with the aforementioned key 21 and the elements associated with it, means to count the exposures and the safety lock which is the object of this invention.

*Means to attach camera back to camera housing*

Figure 2:
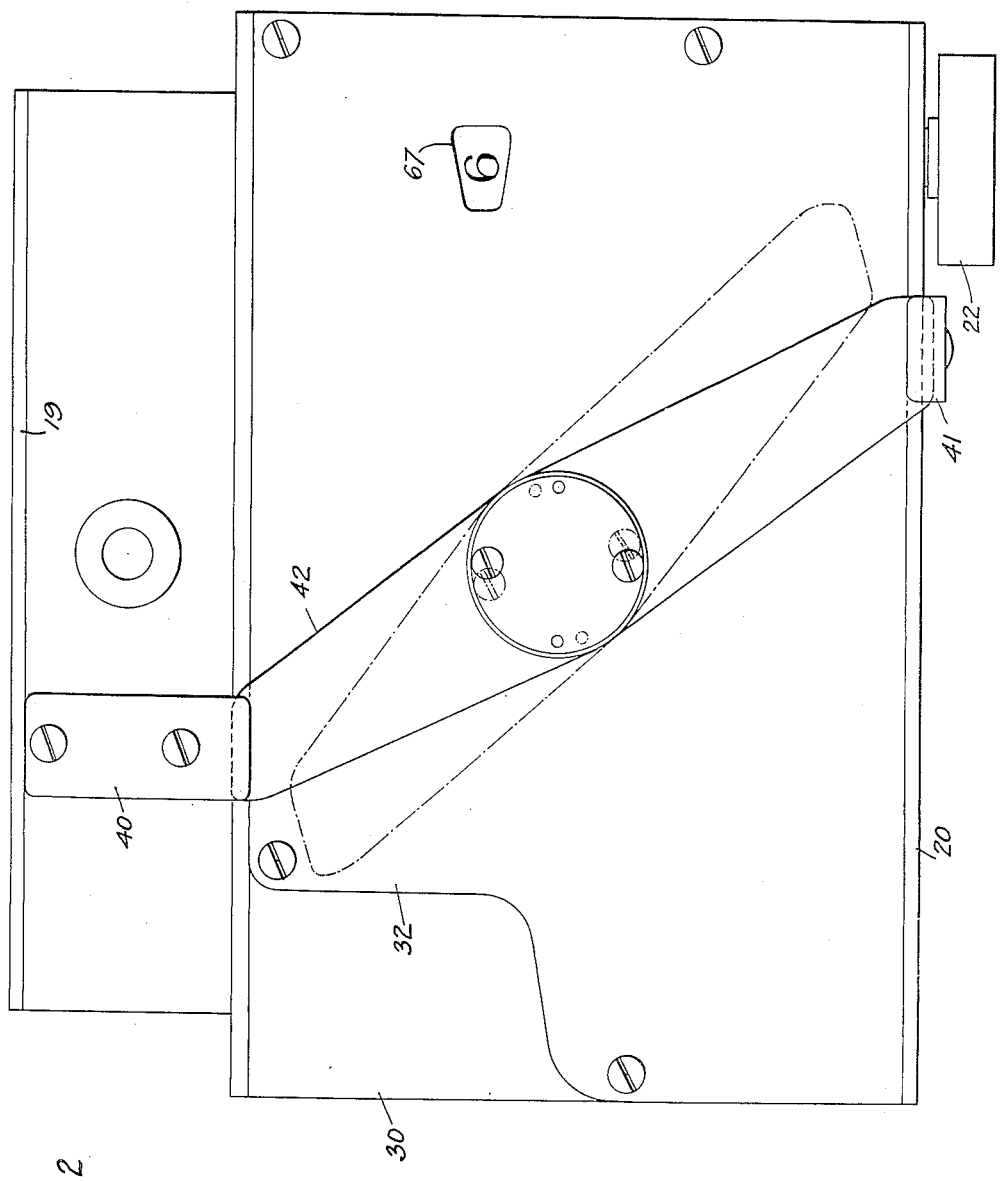

The means used for this purpose may be of many different shapes and designs which are well known in the art, and the one shown in these specifications must, therefore, be merely considered as a preferred example. Referring to Figs. 1 and 2, two projections 40 and 41 are mounted on the camera housing, and a rotatable leaf spring 42 is supported substantially in the middle of the camera back as shown in Fig. 2. This leaf spring has two depressable tips which can engage the two projections 40 and 41 in Fig. 2 and is shown there in solid lines representing the case of the closed camera, and in dotted lines representing the case of the camera about to be opened or closed. The leaf spring is attached to a hub 44 rotatably supported by a shaft 45 which in turn is affixed to the camera back 30. The hub and the shaft are contained within the cavity 31 of the camera back, but the front face of hub 44 projects slightly through a round hole in cover 32, so that the leaf spring 42 which is located at the exterior of the camera back can be actuated and engaged to the housing.

*Film advancing means*

Figure 3:
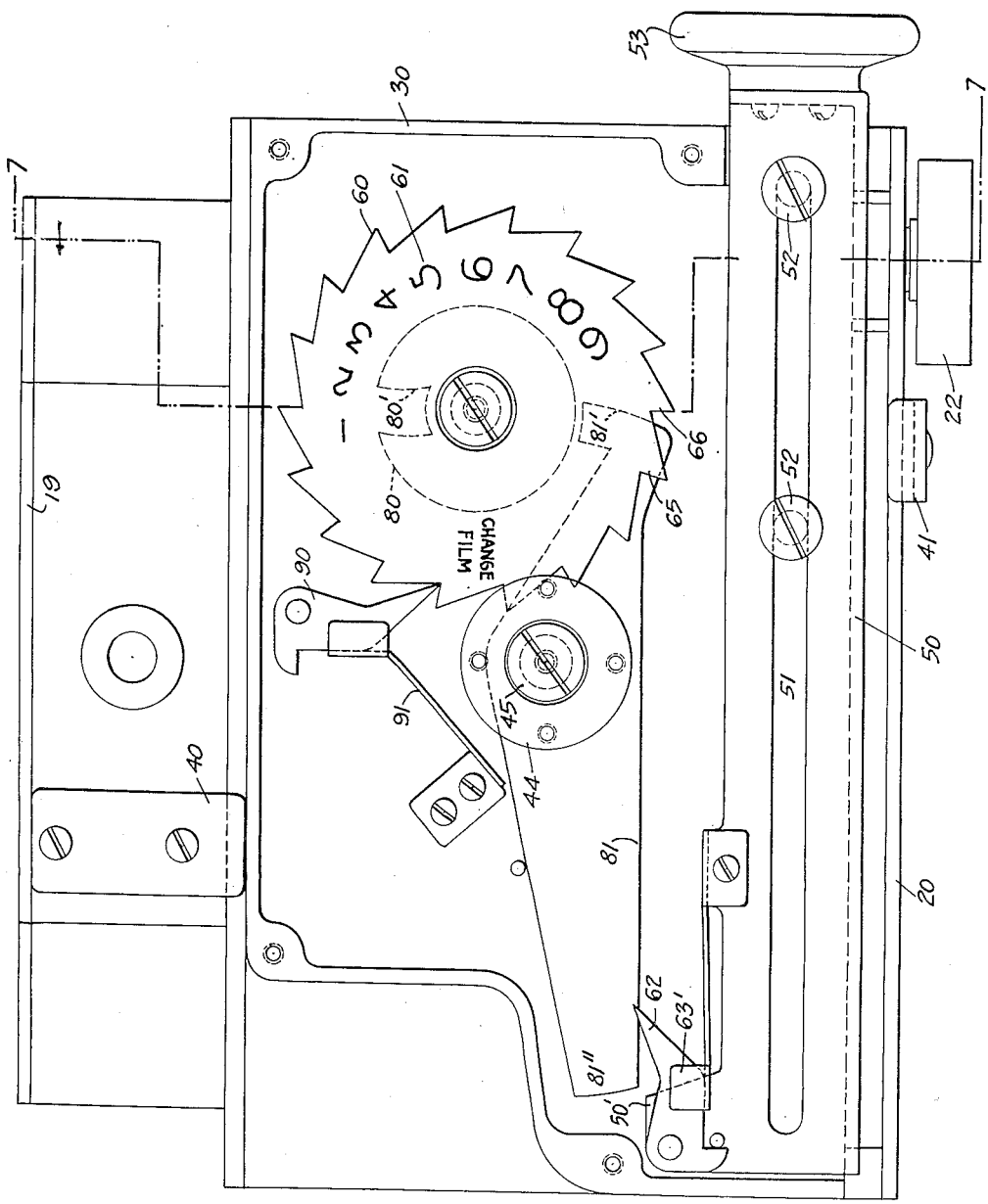
Figure 4:
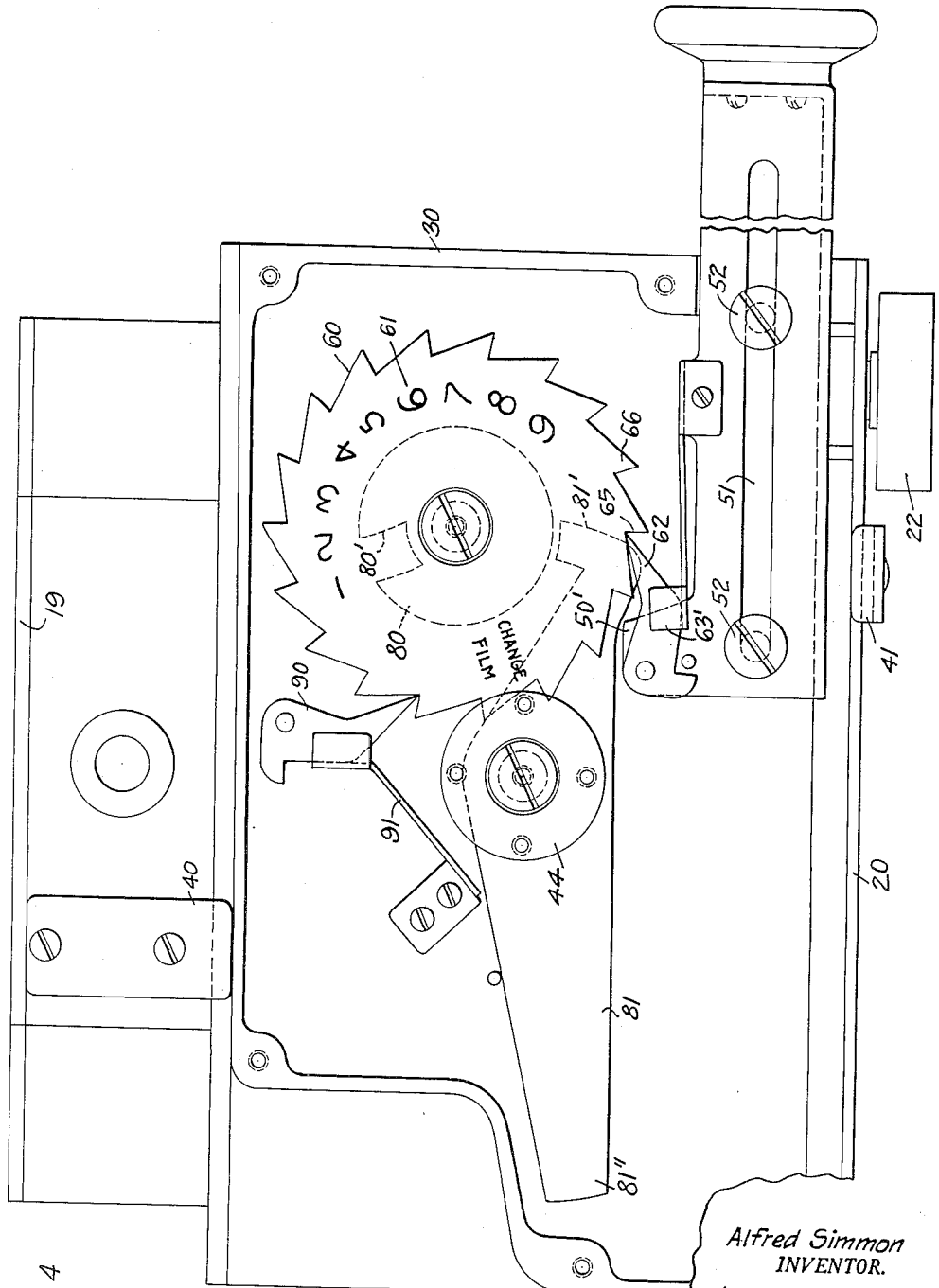
Figure 5:
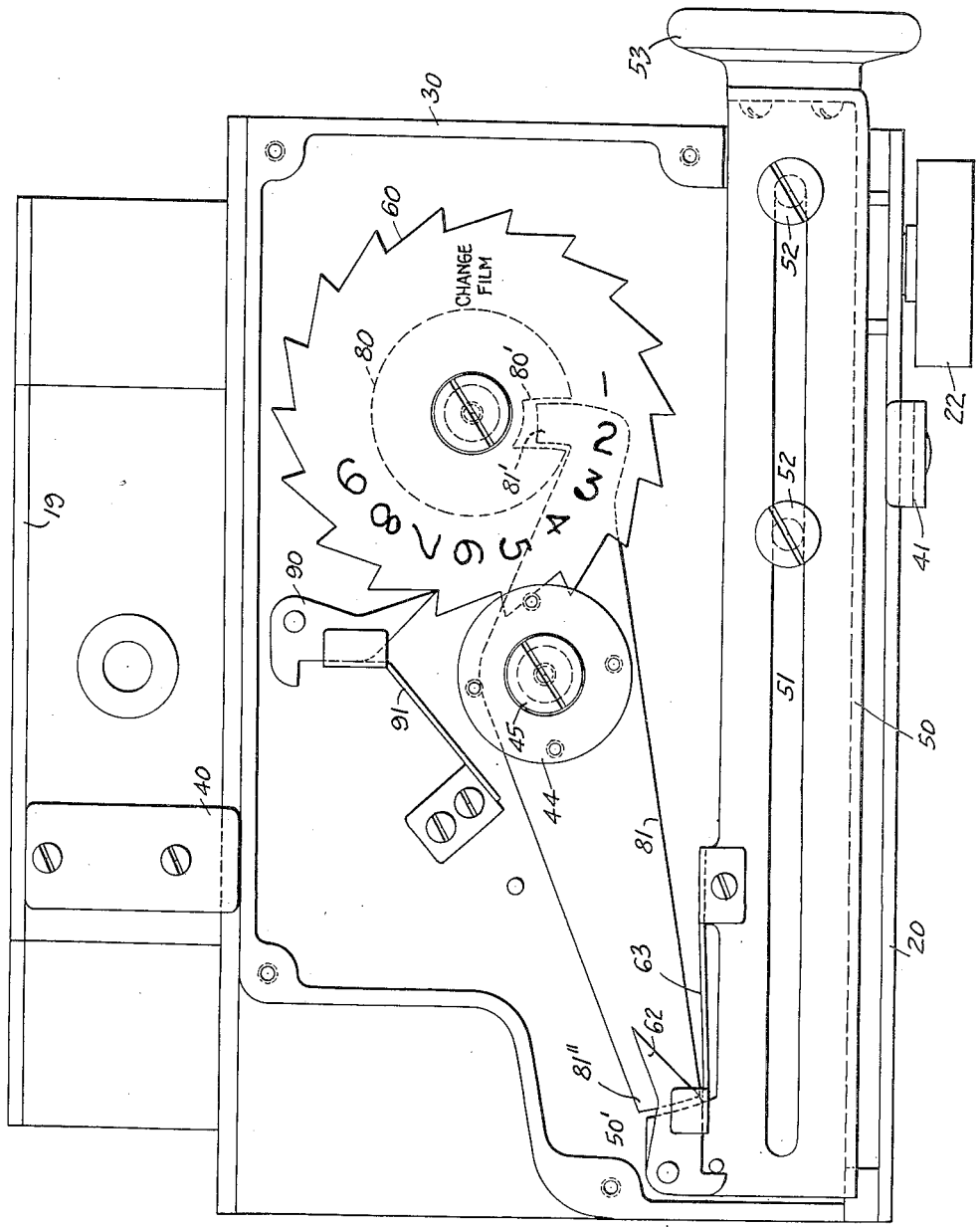

These means may be formed by any of the well known mechanisms that are applicable for this purpose, for example by a crank driven mechanism or the like. In this instance I prefer to use as a master element a reciprocating gear rack 50, as shown in Figs. 3, 4, and 5. This rack or its mechanical equivalent is hereinafter referred to as "the master element." This rack has an elongated slot 51 which engages two supports 52. The gear rack 50 can be actuated by the operator by means of a knob 53 which can be pulled to the right and then returned. Its extreme extended position is shown in Fig. 4. A cross-sectional view of this rack is shown in Figs. 1 and 7, which also illustrate teeth cut into its front face 54. These teeth engage the teeth of the gear 23 which in turn drives film winding key 21. Due to the action of the unidirectional clutch 24, this gear will drive the key in one direction but when it returns into its original position the film key will not return with it. In other words, the operator pulls knob 53 to the extreme position, shown in Fig. 4, and returns it, which causes gear 23 to make a certain number of revolutions, first in one and then in the other direction. Only in one direction, however, does this gear drive the film key.

In order to make the device more fool proof, it is desirable to add to the reciprocating gear rack described up to this point a device which compels the operator to finish the stroke in one direction before he can return the gear rack into its original position, i. e., a device which makes reversal impossible except at the extreme ends of the stroke. A device of this character has not been shown, since it forms no part of this invention, and since devices of this type are well known, for example as applied to calculating machines.

*Exposure counting means*

The main part of the exposure counting means is a ratchet wheel 60 which carries a dial 61. The teeth of the ratchet cooperate with a pawl 62 which is carried by gear rack 50 at its extreme left end. This pawl is biased by a leaf spring 63 which has a bent over end 63' to prevent the pawl from falling off its pivot. It can be seen that ordinarily this pawl is entirely out of contact with any of the teeth of ratchet wheel 60. When, however, the operator pulls knob 53 the pawl 62 will, near the end of the stroke, come in contact with a tooth 65, moving it eventually into a position, shown in Fig. 4, which was formerly occupied by a preceding tooth 66. The characters inscribed upon the dial 61 are visible to the operator through a window 67 in the cover 32 shown in Fig. 2. It will be noted that this dial has a number of exposure indicating digits, in this case 1 to 9, and one position which reads "Change film." Only in the latter position can the camera back be detached from the camera housing.

A second pawl 90 which is biased by a leaf spring 91 is provided for keeping the ratchet wheel 60 in place when it is not actuated and which prevents inadvertent return movements, for example due to vibration.

*Safety lock*

In its broadest conception the safety lock is an operative connection between the film counting means, ratchet wheel 60, and the locking means by which the camera back is attached to the camera housing, leaf spring 42. In practice this means that one of these means must comprise a projection and the other one at least one cavity of corresponding shape, the two so disposed relative to each other that the projection can enter the cavity only in certain predetermined positions. Referring to Fig. 3, it can be seen that a disc 80 with a cavity 80' is attached to the ratchet wheel 60, and a lever 81 with a projection 81' attached to hub 44, and thereby operatively connected to leaf spring 42. It is obvious that in the position shown in Fig. 3 the assembly formed by leaf spring 42, hub 44 and lever 81 cannot be rotated in a counter-clockwise position which would be necessary if the camera back should be detached from the camera housing. This is prevented by the projection 81' which in this position can obviously not enter the cavity 80' of disc 80. After the counting wheel, however, has been advanced a certain number of steps, it will arrive in a position shown in Fig. 5, in which the cavity 80' permits the projection 81' to enter, and in this, and only in this position can the assembly formed by leaf spring 42, hub 44 and lever 81 be rotated counter-clockwise, so that the leaf spring 42 assumes the position shown in Fig. 2 in dotted lines, where it is out of engagement with the projections 40 and 41 of the camera housing, so that the camera back can be detached from the camera house.

It was explained before that the detachment of the camera back from the camera housing would be permitted by the safety lock in two positions, the first one being the one when all film is still contained on the loaded film spool, i. e., before the beginning of an operating cycle, and the second being the one in which the entire film has been transferred, after the end of an operating cycle from the initially loaded spool to the initially empty storage spool. For this purpose, two cavities would have to be provided within disc 80. In practice, however, this design can be further simplified, by giving the ratchet wheel 60 a sufficient number of teeth so that, during an operating cycle, this ratchet wheel performs precisely one whole revolution, returning at the end of an operating cycle into the same position that it occupied at the beginning. In this case the two positions referred to above, in which the camera back can be detached from the camera housing, are made to coincide, and this preferred case can, therefore, be regarded merely as a special case of the general case referred to in the opening paragraph of this specification.

In order to make the device more fool proof, an additional interlock has been devised between the rack 50, which is the main part of the film advancing mechanism and the locking assembly formed by leaf spring 42, hub 44 and lever 81. This additional interlock comprises a second projection 81" attached to lever 81, and a projection 50' attached to gear rack 50. This interlock makes it impossible to pull the film advancing knob 53 when the camera back is detached from the camera housing, when leaf spring 42 assumes the position shown in dotted lines in Fig. 2. In this case projections 81" and 50' have the position relative to each other shown in Fig. 5, whereby it is obviously rendered impossible for the operator to pull knob 53. It can be easily visualized that this interlock is an added safeguard because if, in its absence, the operator would inadvertently actuate knob 53 while the camera back is detached from the camera housing, he would pull the knob 53 almost, but not quite, into the extreme position shown in Fig. 4, but would have to stop as soon as pawl 62 makes contact with tooth 65, see Fig. 3. Further progress would then be imposible since, due to the fact that projection 81' has entered cavity 80', rotation of the ratchet wheel 60 would be impossible. A return of rack 50 would also be impossible due to the mechanism described in the previous paragraph which renders reversal of the stroke impossible, except at the extreme end which, in this case, has not as yet been reached. In other words the device would be deadlocked, and would have to be disassembled before operation would again become possible. Such an occurrence is rendered impossible by the additional interlock just described.

*Operation*

The operation of the device can easily be understood from the foregoing description. When the operator receives an unloaded camera, he first observes the position of the counting wheel through the window in the cover plate 32 of the camera back. If this window at this time does not show the legend "Change film," the operator actuates the film advancing mechanism by pulling knob 53 as far as possible and returning it. This is repeated a sufficient number of times until the legend "Change film" appears in the window. The camera back can then be unlocked and detached from the camera housing. For this purpose the two tips of the leaf spring 42 are depressed and the spring is rotated in a counter-clockwise direction, i. e., shifted from the position shown in solid lines in Fig. 2 into the position shown in dotted lines. The camera back can then be taken off.

The loaded film spool is then inserted into pocket 11 of the camera housing and an empty film spool into the other pocket 12, the slot of the last-named film spool being entered by the key 21 provided for this purpose. The leading end of the paper strip to which the film is attached is then threaded into the empty spool, and this spool is then rotated manually by means of knurled knob 22 until a mark affixed to the leading end of the paper strip assumes a predetermined position, i. e., is in register with another mark placed at a suitable place on the camera housing adjacent to the focal plane. The camera back is then replaced and locked by depressing the two tips of leaf spring 42 and turning said leaf spring in a clockwise direction so that the tips engage the projections 40 and 41.

The operator now actuates the film feeding mechanism several times, each time pulling knob 53 into the extreme position at the right, shown in Fig. 4, and returning it. The number of operations necessary depends upon the length of the leading paper strip to which the film is attached. Three times is usually satisfactory. After this has been done, the number 1 should appear in the window, indicating that the camera is set for the first exposure.

The film feeding mechanism, knob 53, is now actuated after each exposure. Each time this is done the counting wheel 60 advances one step, and the subsequent exposure number appears in the window. In addition to advancing the film and advancing the counting wheel, the shutter will be automatically set, if it is connected to the film advancing mechanism in the manner suggested by Fig. 6.

After the last exposure has been made, the film advancing mechanism is again actuated a certain number of times, so that the covering paper which is usually much longer than the film itself is safely wound upon the initially empty film spool, thereby protecting the film against exposure when it is withdrawn from the camera. The operator stops actuating the film advancing mechanism when the legend "Change film" again appears in the window.

During the entire operating cycle, i. e., when the leading end of the paper is wound upon the initially empty spool, when the camera is actually ready for exposures and when the final end of the film is wound upon the film storage spool, the locking mechanism cannot be actuated. Leaf spring 42 and hub 44 cannot be rotated because the projection 81' cannot enter the cavity 80' of the disc 80. Only in the first and last position, i. e., when the legend "Change film" appears in the window, is such entry possible, and then the leaf spring can be rotated and the camera back thereby unlocked and detached from the camera housing.

When this is done, the additional interlock formed between the projections 81" of lever 81 and the projection 50' of rack 50 prevents the operator from inadvertently pulling knob 53.

What I claim as new is:

1. In a rollfilm camera comprising a camera housing including two pockets located respectively on either side of the exposure aperture and adapted to receive respectively before the start of an operating cycle, a loaded film spool and an empty film storage spool, a detachable camera back, and means to lock said back to said camera housing; a manually operable master element, means actuated by said master element and in operative relation with the film adapted to advance, between exposures, film from the initially loaded spool, to the initially empty spool, past said exposure aperture, means, also actuated by said master element but out of operative relation with said film, to count the number of operations of said master element, and, means operatively connected to said counting means to arrest said locking means in all but two positions, the first position being the one in which the entire film, before the start of an operating cycle, is still completely wound on the loaded spool, and the second position being the one in which the film, after the end of an operating cycle, has been completely wound on the initially empty film storage spool, whereby it becomes impossible to unlock and detach said camera back from said camera housing in all other positions, said film advancing means comprising a rotatable key, adapted to engage said initially empty film storage spool, a gear and a unidirectional clutch connecting said gear to said key, all elements recited so far being carried by the camera housing, said master element including a reciprocating rack, adapted to engage and drive said gear, carried by the camera back, one stroke of said rack imparting a rotary motion to said gear and thereby to said key causing the film to advance a certain length corresponding to one exposure; and said counting means comprising a rotatable ratchet wheel and a dial indicating exposures fastened thereto, both carried by the camera back, and a pawl carried by said rack and normally out of contact with the teeth of said ratchet, but striking one of said teeth at the end of the stroke of said reciprocating rack, causing said ratchet to rotate and said dial to advance from one exposure indicating position to the next one.

2. In a rollfilm camera comprising a camera housing including two pockets located respectively on either side of the exposure aperture and adapted to receive respectively before the start of an operating cycle, a loaded film spool and an empty film storage spool, a detachable camera back, and means to lock said back to said camera housing; a manually operable master element, means actuated by said master element and in operative relation with the film adapted to advance, between exposures, film from the initially loaded spool, to the initially empty spool, past said exposure aperture, means, also actuated by said master element but out of operative relation with said film, to count the number of operations of said master element, and, means operatively connected to said counting means to arrest said locking means in all but two positions, the first position being the one in which the entire film, before the start of an operating cycle, is still completely wound on the loaded spool, and the second position being the one in which the film, after the end of an operating cycle, has been completely wound on the initially empty film storage spool, whereby it becomes impossible to unlock and detach said camera back from said camera housing in all other positions, said film advancing means comprising a rotatable key, adapted to engage said initially empty film storage spool, a gear and a unidirectional clutch connecting said gear to said key, all elements recited so far being carried by the camera housing, said master element including a reciprocating rack, adapted to engage and drive said gear, carried by the camera back, one stroke of said rack imparting a rotary motion to said gear and thereby to said key causing the film to advance a certain length corresponding to one exposure; said counting means comprising a rotatable ratchet wheel and a dial indicating exposures fastened thereto, both carried by the camera back, and a pawl carried by said rack and normally out of contact with the teeth of said ratchet, but striking one of said teeth at the end of the stroke of said reciprocating rack, causing said ratchet to rotate and said dial to advance from one exposure indicating position to the next one; said locking means comprising two projections associated with said camera housing, and a two-armed leaf spring and a rotatable shaft, both associated with said camera back, said leaf spring having two depressable tips at its two arms, respectively, adapted to engage said projections when said back is attached to said camera housing, said shaft penetrating said camera back substantially in its center, one of its ends located at the exterior of said camera, the center of said leaf spring fixedly attached to said end; and said means to arrest said locking means comprising a disc attached to said ratchet wheel, and a member affixed to the other end of said shaft, the disc and the member having in cooperation a projection and at least one corresponding cavity, whereby motion of said member relative to said disc becomes possible only in selected positions of said ratchet wheel, when said projection can enter said cavity.

3. In a rollfilm camera comprising a camera housing including two pockets located respectively on either side of the exposure aperture and adapted to receive respectively before the start of an operating cycle, a loaded film spool and an empty film storage spool, a detachable camera back, and means to lock said back to said camera housing; a manually operable master element, means actuated by said master element and in operative relation with the film adapted to advance, between exposures, film from the initially loaded spool, to the initially empty spool, past said exposure aperture, means, also actuated by said master element but out of operative relation with said film, to count the number of operations of said master element, and, means operatively connected to said counting means to arrest said locking means in all but two positions, the first position being the one in which the entire film, before the start of an operating cycle, is still completely wound on the loaded spool, and the second position being the one in which the film, after the end of an operating cycle, has been completely wound on the initially empty film storage spool, whereby it becomes impossible to unlock and detach said camera back from said camera housing in all other positions, said film advancing means comprising a rotatable key, adapted to engage said initially empty film storage spool, a gear and unidirectional clutch connecting said gear to said key, all elements recited so far being carried by the camera housing, said master element including a reciprocating rack, adapted to engage and drive said gear, carried by the camera back, one stroke of said rack imparting a rotary motion to said gear and thereby to said key causing the film to advance a certain length corresponding to one exposure, said rack equipped with a projection; said counting means comprising a rotatable ratchet wheel and a dial indicating exposures fastened thereto, both carried by the camera back, and a pawl carried by said rack and normally out of contact with the teeth of said ratchet, but striking one of said teeth at the end of the stroke of said reciprocating rack, causing said ratchet to rotate and said dial to advance from one exposure indicating position to the next one; said locking means comprising two projections associated with said camera housing, and a two-armed leaf spring and a rotatable shaft, both associated with said camera back, said leaf spring having two depressable tips at its two arms, respectively, adapted to engage said projections when said back is attached to said camera housing, said shaft penetrating said camera back substantially in its center, one of its ends located at the exterior of said camera, the center of said leaf spring fixedly attached to said end; and said means to arrest said locking means comprising a disc attached to said ratchet wheel, and a member affixed to the other end of said shaft, the member having a projection and the disc at least one corresponding cavity, whereby motion of said member relative to said disc becomes possible only in selected positions of said ratchet wheel, when said projection can enter said cavity, said member equipped with an additional projection adapted to be moved into the path of the aforementioned projection with which the rack of the film advancing means is equipped, whereby an additional interlock is formed between said film advancing means and said counting and locking means, said interlock automatically arresting said film advancing means in the positions in which the camera back can be detached from the camera housing.

ALFRED SIMMON.

REFERENCES CITED

The following references are of record in the file of this patent:

UNITED STATES PATENTS

| Number | Name | Date |
| --- | --- | --- |
| 2,148,636 | Muller | Feb. 28, 1939 |
| 2,380,034 | Doyle | July 10, 1945 |
| 2,393,534 | Hineline | Jan. 22, 1946 |

FOREIGN PATENTS

| Number | Country | Date |
| --- | --- | --- |
| 598,202 | Great Britain | Feb. 12, 1948 |